United States Patent Office 3,155,741
Patented Nov. 3, 1964

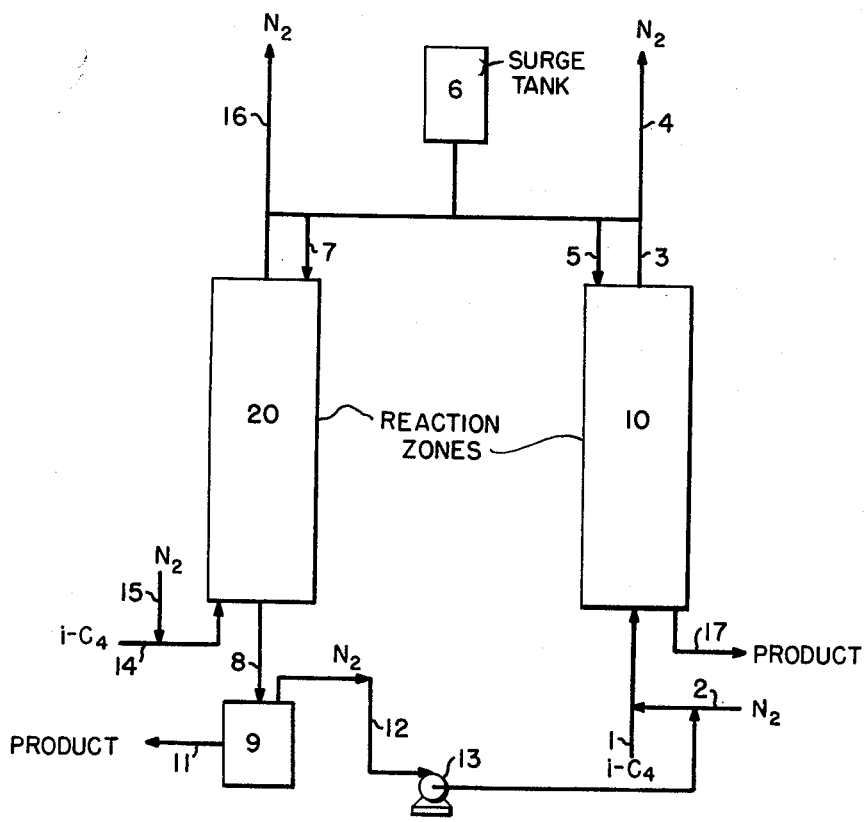

3,155,741
CHEMICAL REACTIONS IN A HEATLESS FRACTIONATION APPARATUS
Charles W. Skarstrom, Montvale, N.J., assignor to Esso Research and Engineering Company, a corporation of Delaware
Filed June 17, 1960, Ser. No. 36,849
8 Claims. (Cl. 260—683.15)

The present invention is broadly concerned with a new technique for carrying out chemical reactions. The invention comprises a continuation-in-part and an improvement and adaptation of the process and apparatus described in copending application, Serial No. 714,780, filed February 12, 1958, U.S. Patent No. 2,944,627, entitled "Method and Apparatus for Fractionating Gaseous Mixtures," inventor, Charles W. Skarstrom.

In accordance with the present invention a cyclic operation is utilized wherein reactants are introduced into a high pressure zone and wherein the reaction products are removed from the low pressure zone. Particular operations contemplated are polymerization processes, copolymerization processes, alkylation processes, isomerization processes and chemical reactions, generally. In essence, the operation comprises the utilzation of two packed beds which are alternately raised to a relatively high pressure and then reduced to a relatively low pressure. In accordance with the specific adaptation of the invention, a polymerization reaction is carried out in the high pressure bed, using a selected catalyst and the polymerization product removed from the low pressure bed.

It is well known in the art to carry out chemical reactions using various techniques. It is known to carry out polymerization processes, utilizing many types of catalyst, both liquid and gaseous. The feed materials likewise comprise many types of unsaturated hydrocarbons, and the like. However, in accordance with the present invention, the technique disclosed in the parent case is utilized for conducting chemical reactions.

The present invention may be more readily understood by reference to the drawing illustrating one adaptation of the same. The drawing will be described in conjunction with the polymerization of isobutylene.

Zones 10 and 20 are packed with 5A molecular sieves or other suitable catalysts. Zone 10 is on the polymerization cycle, while zone 20 is on the removal of the polymer product cycle. Zone 10 is maintained at a relatively high pressure, while zone 20 is maintained at a relatively low pressure. In accordance with the present process, a stream comprising isobutylene is introduced into the bottom of zone 10 by means of line 1. This stream is preferably comprised with a nitrogen-rich stream introduced into line 1 by means of line 2. This stream passes upwardly through zone 10, maintained at a desirable temperature and pressure wherein the isobutylene is polymerized to secure the desired molecular weight polymer. Nitrogen is removed overhead by means of line 3 and may be withdrawn from the system by means of line 4. The nitrogen introduced and utilized in zone 10 may be secured and is preferably secured in a manner as described in the parent application.

It is preferred to pass the nitrogen from the top of zone 10, through line 5 and to introduce a portion of this nitrogen into surge tank 6, which will be utilized to repressure zone 20 to the polymerization pressure as hereinafter described.

When zone 10 goes on the polymerization cycle at a relative high pressure, the pressure at the lower end of zone 20 is reduced to a relatively low pressure and nitrogen is introduced into the top of zone 20 from high pressure surge tank 6 by means of line 7, thus counter-washing zone 20 as compared to the flow direction of the feed gas when zone 20 is on the polymerization cycle. Nitrogen and the polymer product is removed from the bottom of zone 20 by means of line 8 and introduced into a separation zone 9. This separation zone may comprise any suitable equipment for the separation of the polymer product from the nitrogen. The polymer product is removed from separation zone 9 by means of line 11, while the nitrogen is removed by means of line 12. This nitrogen may be compressed in zone 13 and recycled to the feed being introduced into zone 10.

Prior to the time when zone 10 becomes saturated with polymer product, flow through line 8 is discontinued and zone 20 brought up to the relatively high polymerization pressure. At this point, the polymer product is removed from zone 10 in a manner similar to that described with respect to zone 20 and zone 20 goes on the polymerization cycle in a manner similar to that described with respect to zone 10. This is accomplished by introducing a feed comprising isobutylene through line 14 by introducing nitrogen by means of line 15. Nitrogen may be withdrawn from the system by means of line 16, but is preferably handled in a manner similar to that described with respect to zone 10. This means that a portion of the nitrogen removed from the top of zone 20 is introduced into surge tank 6 and also into the top of zone 10 in a manner to backwash the polymer product from the bottom of zone 10 by means of line 17. This product removed by means of line 17 may be handled as desired. It is, however, preferred by proper manifolding and by proper valving (not shown for the sake of simplicity) to introduce this product into a separation zone 9, to separate the polymer product from the nitrogen and, under certain circumstances, to recycle the segregated nitrogen into the feed being introduced into the bottom of zone 20. The operation is then cyclically continued as described.

The present invention may be more fully understood by the following example, illustrating one embodiment of the same.

*Example*

Isobutylene was introduced into a bed of dried 5A molecular sieves. The conversion of isobutylene to polymer (average molecular weight 242) was 100%. A five minute adsorption cycle was utilized at a temperature of 75° F. The relatively high pressure was about 18 p.s.i.g. The lowest pressure was atmospheric pressure. The average bed temperature was about 110° F. in 75° F. ambient.

From the foregoing, it is apparent that a polymer can be produced continuously. Other inert gases, such as, hydrogen, methane, nitrogen, and the like, mixed with the feed, are preferably used to sweep non-polymerizing feed components out to the primary effluent and away from the reaction zone.

Thus, a crude isobutylene stream may be used. In addition, these inert gases used at total reflux at a lower pressure sweep the reaction products (polymer) out of the beds as a secondary (feed end) effluent. Further, these backwashing gases aid in removing (or adding) heat from the bed during the back purge. This is desirable where the reaction is exothermic (or endothermic).

Because the conversion of feed isobutylene to its polymer was so vigorous (100%) on the 5A sieve in this process, copolymerization with other materials is likely, such as propylene, butadiene, isoprene, etc. It should be noted that no noticeable isobutylene polymerization occurred when the feed pressure was atmospheric (0 p.s.i.g.). It did occur vigorously at 18 p.s.i.g.

Other types of catalysts may be utilized, as for example, activated alumina, activated carbon, silica gels, cobalt molybdenum type of catalysts, and the like.

The process of the present invention may be used as a feed preparation step for other catalytic processes where high molecular weight polymers or copolymers are desired, as for example, in the manufacture of butyl rubber and the like.

What is claimed is:

1. A process for reacting in vapor phase at least one component of a gaseous mixture stream comprising the steps of:

(a) Flowing a gaseous mixture comprising said component through a first bed of catalyst at a preselected, initial, relatively high pressure and in a positive flow direction, wherein desorbable reaction product is formed in said first bed, said catalyst being capable of causing said component to undergo a chemical reaction under the conditions of the process to result in a desorbable reaction product;

(b) Discharging primary effluent comprising nonreacting and nonsorbable components of said gaseous mixture stream from said first bed;

(c) Segregating at least a portion of said primary effluent and passing the same in reverse flow through a second bed of catalyst at a relatively low pressure, which second bed of catalyst initially contains relatively more reaction product of said component as compared with said first bed at the start of the cycle, whereby as said cycle continues, the amount of product in said first bed increases and whereby the amount of product in said second bed decreases;

(d) Continuing said initial cycle for a time period sufficient to cause formation of a desorbable amount of said reaction product;

(e) Thereafter introducing another portion of said gaseous mixture into said second bed in a positive flow direction at an initial relatively high pressure;

(f) Discharging a primary effluent comprising nonreacting and nonsorbable components of said gaseous mixture stream from said second bed;

(g) Segregating at least a portion of said second bed primary effluent and passing the same at a relatively low pressure in reverse flow through said first bed of catalyst;

(h) Recovering both the primary effluent portions passed in reverse flow through the respective beds and component reaction product which is desorbed because of the lower pressure and the purge action of said primary effluent, and (i) Thereafter cyclically continuing the operation.

2. A process according to claim 1 wherein said gaseous mixture also contains an inert gas.

3. Process as defined by claim 1 wherein the primary effluent and component reaction product removed from the low pressure bed is handled in a manner to separate said reaction product from said primary effluent and wherein said primary effluent is recycled to the high pressure bed.

4. Process as defined by claim 1 wherein said reaction is a polymerization reaction and wherein the product of said polymerization reaction is capable of being desorbed from said catalytic bed under the conditions of pressure and temperature utilized in said process 5. A process for reacting in vapor phase at least one component in a gaseous mixture stream comprising the steps of:

(a) Flowing a gaseous mixture comprising said component through a first bed of an adsorbent having catalytic activity, at a preselected, initial, relatively high pressure and in a positive flow direction wherein desorbable reaction product of said component is formed in said first bed, said catalytic activity being such as to cause said component to undergo a chemical reaction under the conditions of the process to result in said desorbable reaction product;

(b) Discharging primary effluent comprising nonreacting and nonsorbable components of said gaseous mixture stream from said first bed;

(c) Segregating at least a portion of said primary effluent and passing the same at a relatively low pressure in reverse flow through a second bed of said adsorbent having catalytic activity, which second bed contains relatively more reaction product of said component as compared with said first bed at the start of the cycle, whereby as the cycle continues, the amount of product in said first bed increases and whereby the amount of product in said second bed decreases;

(d) Continuing said cycle for a time period sufficient to cause formation of some reaction product;

(e) Thereafter introducing another portion of said gaseous mixture into said second bed in a positive flow direction at an initial relatively high pressure;

(f) Discharging a primary effluent comprising nonreacting and nonsorbable components of said gaseous mixture stream from said second bed;

(g) Segregating at least a portion of said second bed primary effluent and passing the same in reverse flow through said first bed of catalyst at a relatively low pressure;

(h) Recovering both the primary effluent portions passed in reverse flow through the respective beds and component reaction product, which is desorbed because of the lower pressure and the purge action of said primary effluent; and (i) Thereafter cyclically continuing the operation.

6. A process according to claim 5 wherein said gaseous mixture also contains an inert gas.

7. Process as defined by claim 1 wherein said adsorbent having catalytic activity is a 5A molecular sieve wherein said component comprises isobutylene.

8. Process as defined by claim 7 wherein said gaseous mixture comprises nitrogen.

References Cited in the file of this patent

UNITED STATES PATENTS

| 1,728,732 | Jaeger | Sept. 17, 1929 |
| 2,825,721 | Hogan | Mar. 4, 1958 |
| 2,880,818 | Dow | Apr. 7, 1959 |
| 2,944,627 | Skarstrom | July 12, 1960 |

OTHER REFERENCES

Barrer: J. Soc. Chem. Ind., 64, 130–135 (1945).